United States Patent
Conley et al.

(10) Patent No.: US 8,701,304 B2
(45) Date of Patent: Apr. 22, 2014

(54) MEASURING TOOL FOR VEHICLE PEDALS

(75) Inventors: Robert J Conley, Saginaw, MI (US);
Thomas Derocher, White Lake, MI (US); Alan J. Calder, Warren, MI (US);
Thomas A. Brock, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 371 days.

(21) Appl. No.: 13/227,426

(22) Filed: Sep. 7, 2011

(65) Prior Publication Data

US 2013/0055805 A1    Mar. 7, 2013

(51) Int. Cl.
*G01B 5/14* (2006.01)

(52) U.S. Cl.
USPC .................................. 33/600; 33/809; 33/613

(58) Field of Classification Search
USPC ................... 33/600, 806, 809, 613
See application file for complete search history.

(56) References Cited

U.S. PATENT DOCUMENTS

| | | | | |
|---|---|---|---|---|
| 3,371,423 A | * | 3/1968 | Paul | 33/666 |
| 3,812,587 A | * | 5/1974 | Elkins et al. | 33/764 |
| 4,227,314 A | * | 10/1980 | Schliep | 33/480 |
| 4,477,978 A | * | 10/1984 | Azuma | 33/600 |
| 4,614,043 A | * | 9/1986 | Nagano et al. | 33/529 |
| 4,663,855 A | * | 5/1987 | Hamilton et al. | 33/288 |
| 5,179,787 A | * | 1/1993 | Ostrowski | 33/613 |
| 6,874,246 B2 | * | 4/2005 | Cookson | 33/806 |
| 7,073,267 B2 | * | 7/2006 | Butler et al. | 33/203 |
| 8,397,397 B1 | * | 3/2013 | Long et al. | 33/600 |
| 8,464,435 B2 | * | 6/2013 | Johnson et al. | 33/600 |

\* cited by examiner

*Primary Examiner* — Christopher Fulton

(57) ABSTRACT

A tool measures the vertical distance and lateral distance between a brake pedal pad and an accelerator pedal pad. A base plate lies atop the brake pedal pad. A first measuring plate is mounted on the base plate for movement laterally toward and away from the accelerator pedal pad. A second measuring plate is mounted on the first measuring plate for movement laterally with the first measuring plate to engage a lateral edge of the accelerator pedal pad and for movement vertically to engage with a top surface of the accelerator pedal pad. First measuring indicia provided on the base plate and the first measuring plate reads the lateral distance between the brake pedal pad and the accelerator pedal pad. And a second measuring indicia provided on the first measuring plate and the second measuring plate reads the vertical height between the brake pedal pad and the accelerator pedal pad.

14 Claims, 1 Drawing Sheet

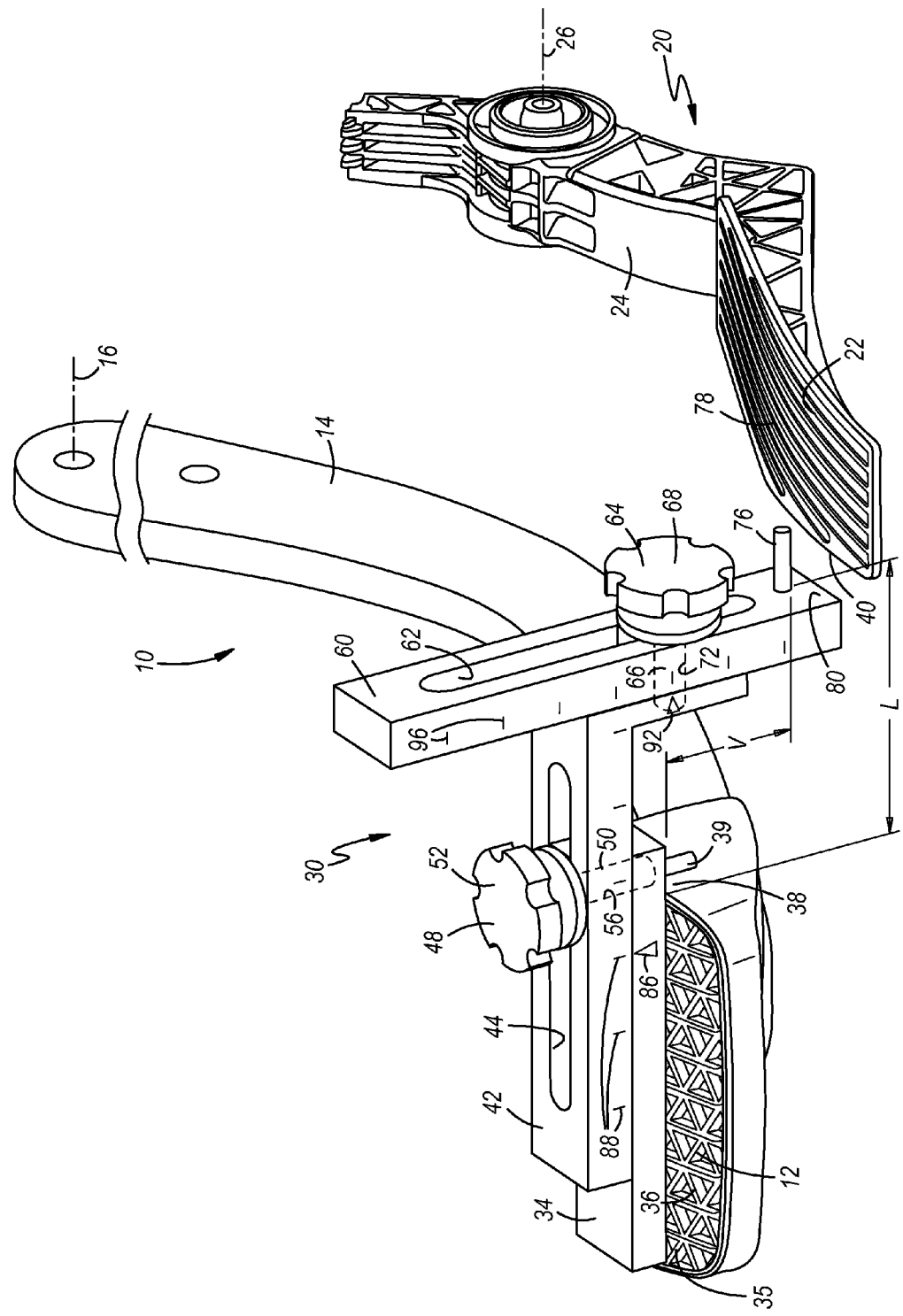

MEASURING TOOL FOR VEHICLE PEDALS

FIELD OF THE INVENTION

The present invention relates to a tool for measuring the distance between a brake pedal and an accelerator pedal in a motor vehicle.

BACKGROUND OF THE INVENTION

Motor vehicles are equipped with a brake pedal and an accelerator pedal that are each pivotally mounted on the vehicle. While driving the vehicle, the user will be repeatedly lifting and lowering his foot vertically and moving his foot laterally side-to-side in order to move his foot between the brake pedal and the accelerator pedal. The comfort and convenience experienced by the user depends upon the vertical distance between the two pedals, and depends upon the lateral distance between the two pedals.

It would be desirable to provide a tool for simply and effectively measuring the vertical distance and lateral distance between the brake pedal and the accelerator pedal of a motor vehicle.

SUMMARY OF THE INVENTION

A tool measures the vertical distance and lateral distance between a brake pedal pad and an accelerator pedal pad. A base plate lies atop the brake pedal pad. A first measuring plate is mounted on the base plate for movement laterally toward and away from the accelerator pedal pad. A second measuring plate is mounted on the first measuring plate for movement laterally with the first measuring plate to engage a lateral edge of the accelerator pedal pad and for movement vertically to engage with a top surface of the accelerator pedal pad. First measuring indicia provided on the base plate and the first measuring plate reads the lateral distance between the brake pedal pad and the accelerator pedal pad. A second measuring indicia provided on the first measuring plate and the second measuring plate reads the vertical height between the brake pedal pad and the accelerator pedal pad.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawing in which FIG. 1 is a perspective view of a tool for measuring the vertical distance and lateral distance between a brake pedal and an accelerator pedal.

DETAILED DESCRIPTION OF THE EXEMPLARY EMBODIMENTS

The following description of certain exemplary embodiments is merely exemplary in nature and not intended to limit the invention, its application, or uses.

Referring to FIG. 1, a brake pedal, generally indicated at 10, includes a brake pedal pad 12 mounted on a brake pedal arm 14. The brake pedal arm 14 pivots about a pivot axis 16. An accelerator pedal, generally indicated at 20, includes an accelerator pad 22 mounted on an accelerator pedal arm 24. The accelerator pedal 20 pivots about an axis 26. FIG. 1 shows the brake pedal 10 and the accelerator pedal 20 established at their normal rest positions without the vehicle user's foot pressing down on the pedals. At this normal rest position, the lateral distance designated L is the lateral distance between the closest edges of the brake pedal 10 and accelerator pedal 20. In addition, at this normal rest position, there is a vertical distance V between the top surfaces of the brake pedal 10 and accelerator pedal 20.

A measuring tool, generally indicated at 30, measures the lateral distance L and the vertical distance V. The measuring tool 30 includes a base plate 34 having a contact surface 35 that lies on a top surface 36 of the brake pedal pad 12. Base plate 34 has a feeler abutment 39 depending downwardly to engage with a lateral edge 38 of the brake pedal pad 12 that is closest to lateral edge 40 of the accelerator pedal pad 22. Thus, the contact surface 35 and the feeler abutment 39 cooperate to provide a pedal feeler for locating the base plate 34 on the brake pedal pad 12.

A first measuring plate 42 rests atop the base plate 34 and has a slot 44 therein. A clamp 48 includes a threaded shaft 50 and a knob 52. The threaded shaft 50 is threaded into a threaded hole 56 provided in the base plate 34. When the knob 52 is tightened, the first measuring plate 42 cannot slide or rotate on the base plate 34. When the knob 52 is loosened, the first measuring plate 42 can slide left and right toward and away from the accelerator pedal 20, and also pivot about the threaded shaft 50.

A second measuring plate 60 is movably mounted on the end of the first measuring plate 42. The second measuring plate 60 has a slot 62. A clamp 64 includes a threaded shaft 66 and a knob 68. The threaded shaft 66 extends through the slot 62 and is seated within a threaded hole 72 provided in the end of the first measuring plate 42. When the knob 68 is tightened, the second measuring plate 60 is clamped against the end of the first measuring plate 42 and cannot rotate or move up and down vertically relative to the first measuring plate 42. When the knob 68 is loosened, the second measuring plate 60 can move up and down vertically and also rotate. The second measuring plate 60 has a feeler abutment 76 projecting therefrom for engaging with a top surface 78 that is closest to the top surface 36 of the brake pedal pad 12. In addition, the second measuring plate 60 has a contact surface 80 that engages with the lateral edge 40 of the accelerator pedal pad 22 that is closest to the lateral edge 38 of the brake pedal pad 12. Thus, the feeler abutment 76 and the contact surface 80 cooperate to provide a pedal feeler to locate the second measuring plate 60 relative the accelerator pedal pad 22.

Measuring indicia are provided between the base plate 34 and the first measuring plate 42. As seen in FIG. 1, a pointer mark 86 is provided on the base plate 36 and a plurality of spaced apart indicia markings 88 are provided on the base plate 34. The markings 88 provide a linear scale which can be denominated in inches or millimeters. Likewise, measuring indicia are provided between the first measuring plate 42 and the second measuring plate 60. In particular, a pointer mark 92 is provided on the first measuring plate 42 and a plurality of spaced apart indicia markings 96 is provided on the second measuring plate 60. The markings 96 provide a linear scale which can be denominated in inches or millimeters.

In operation, a user of the tool 30 will position the base plate 34 atop the brake pedal pad 12 with the feeler abutment 39 contacting the lateral edge 38 of the brake pedal pad 12. Then, the first measuring plate 42 will be slid left and right and pivoted, and the second measuring plate 60 will be slid vertically and pivoted to engage the abutment feeler 76 with the top surface 78 of the accelerator pedal pad 22 and to engage the contact surface 80 of the second measuring plate 60 with the lateral edge 40 of the accelerator pedal pad 22. When thus positioned, the clamps 48 and 64 are preferably tightened to lock the first and second measuring plates 42 and 60 in place. If needed, the clamps 48 and 64 can be loosened and retightened if any further precise adjustments need to be made. Then, the user can read the indicia markings 88 to determine the lateral distance L between the brake pedal pad 12 and accelerator pedal pad 22, and also read the indicia markings 96 to determine the vertical distance between the brake pedal pad 12 and accelerator pedal pad 22.

Thus, in view of the foregoing, it is seen that the invention provides a tool for measuring the vertical distance and lateral distance between a brake pedal and an accelerator pedal.

The drawings show the base plate of the tool resting on the brake pedal, and then the measuring plates are moved to reach out and feel the resting position of the accelerator pedal. However, it will be understood that the tool can also be used by resting the base plate on the accelerator pedal, and then moving the measuring plates to reach out and feel the resting location of the brake pedal. In addition, although the drawings herein show the pedal feelers as being a contact surfaces on the measuring plates, and pins projecting from the measuring plate, other structures can be easily constructed to accomplish the feeling of the location of the lateral edges of the pedals and the top surfaces of the pedals.

What is claimed is:

1. A tool for measuring the vertical distance and lateral distance between a brake pedal pad and an accelerator pedal pad in a motor vehicle comprising:
   a base plate lying atop a pad surface of one of the pedal pads;
   a first measuring plate movably mounted on the base plate for movement laterally thereon in a direction toward and away from the other of the pedal pads;
   a second measuring plate movably mounted on the first measuring plate for movement laterally with the first measuring plate to engage with a lateral edge of the other of the pedal pads and for vertical movement relative to the first measuring plate to engage with a pad surface of the other of the pedal pads;
   a first measuring indicia provided on the base plate and the first measuring plate from which a user can read the lateral distance between the brake pedal pad and the accelerator pedal pad;
   a second measuring indicia provided on the first measuring plate and the second measuring plate from which a user can read the vertical height between the brake pedal pad and the accelerator pedal pad; and,
   said first measuring plate being movably mounted on the base plate by a slot provided in one of the first measuring plate and base plate, and a clamp threaded into the other of the first measuring plate and base plate, and permitting both sliding and pivoting movement of the first measuring plate relative to the base plate until the clamp is tightened.

2. The tool of claim 1 further comprising a releasable clamp for clamping the second measuring plate to the first measuring plate.

3. The tool of claim 1 further comprising a pedal feeler provided on the base plate for engaging the lateral edge of the one of the pedal pads.

4. The tool of claim 1 further comprising a pedal feeler provided on the second measuring plate for engaging the lateral edge and a top surface of the other of the pedal pads.

5. The tool of claim 1 further comprising further comprising a brake pedal feeler provided on the base plate and engaging the lateral edge of the brake pedal pad, and an accelerator pedal feeler provided on the second measuring plate for engaging the lateral edge and a top surface of the accelerator pedal pad.

6. The tool of claim 1 further comprising the second measuring plate being movably mounted on the first measuring plate by a slot provided in one of the first measuring plate and second measuring plate, and a clamp threaded into the other of the first measuring plate and the second measuring plate, and permitting both sliding and pivoting movement of the first measuring plate relative to the base plate.

7. The tool of claim 1 further comprising the first measuring plate being movably mounted on the base plate including a slot provided in the first measuring plate, and a first clamp threaded into the base plate, and permitting both sliding and pivoting movement of the first measuring plate relative to the base plate until the clamp is tightened, and the second measuring plate being movably mounted on the first measuring plate by a slot provided in the second measuring plate, and a second clamp threaded into the first measuring plate and permitting both sliding and pivoting movement of the first measuring plate relative to the base plate until the clamp is tightened.

8. The tool of claim 1 further comprising a first pedal feeler provided on the base plate for engaging the lateral edge of the one of the pedal pads and a second feeler for engaging the lateral edge and a top surface of the other of the pedal pads.

9. A tool for measuring the vertical distance and lateral distance between a brake pedal pad and an accelerator pedal pad in a motor vehicle, said tool comprising:
   a base plate lying a top a top surface of the brake pedal pad and having a first feeler abutment that engages with a lateral edge of the brake pedal pad;
   a first measuring plate movably mounted on the base plate for movement laterally thereon in a direction toward and away from the accelerator pedal pad;
   a second measuring plate having a contact surface for engaging with a lateral edge of the accelerator pedal and a second feeler abutment for engaging a top surface of the accelerator pedal, said second measuring plate being movably mounted on the first measuring plate for movement vertically on the first measuring plate toward and away from the accelerator pedal;
   a first measuring indicia provided on the base plate and the first measuring plate from which a user can read the lateral distance between the brake pedal pad and the accelerator pedal pad;
   a second measuring indicia provided on the first measuring plate and the second measuring plate from which a user can read the vertical height between the pad surfaces of the brake pedal pad and the accelerator pedal pad; and,
   said second measuring plate being movably mounted on the first measuring plate by a slot provided in one of the first measuring plate and second measuring plate, and a clamp threaded into the other of the first measuring plate and the second measuring plate, and permitting both sliding and pivoting movement of the first measuring plate relative to the base plate until the clamp is tightened.

10. The tool of claim 9 further comprising a releasable clamp for clamping the first measuring plate to the base plate.

11. The tool of claim 9 further comprising a first releasable clamp for clamping the first measuring plate to the base plate and a second releasable clamp for clamping the second measuring plate to the first measuring plate.

12. The tool of claim 9 further comprising the first measuring plate being movably mounted on the base plate by a slot provided in one of the first measuring plate and base plate, and a clamp threaded into the other of the first measuring plate and base plate, and permitting both sliding and pivoting movement of the first measuring plate relative to the base plate until the clamp is tightened.

13. The tool of claim 9 further comprising the first measuring plate being movably mounted on the base plate including a slot provided in the first measuring plate, and a first clamp threaded into the base plate and permitting both sliding and pivoting movement of the first measuring plate relative to the base plate until the clamp is tightened, and the second measuring plate being movably mounted on the first measuring plate by a slot provided in the second measuring plate, and a clamp threaded into the other of the first measuring plate, and permitting both sliding and pivoting movement of the first measuring plate relative to the base plate until the clamp is tightened.

14. A tool for measuring the vertical distance and lateral distance between a brake pedal pad and an accelerator pedal pad in a motor vehicle, said tool comprising:
   a base plate lying a top a top surface of the brake pedal pad and having a first feeler abutment that engages with a lateral edge of the brake pedal pad;
   a first measuring plate having a slot therein;
   the first threaded shaft extending through the slot of the first measuring plate and threaded into the base plate, said first threaded shaft having a first knob for rotation of the threaded shaft to clamp the first measuring plate to the base plate or unclamp the first measuring plate for sliding and pivoting movement on the base plate in a direction toward and away from the accelerator pedal pad;
   a second measuring plate having a contact surface for engaging with a lateral edge of the accelerator pedal and a second feeler abutment for engaging a top surface of the accelerator pedal,
   a second threaded shaft extending through the slot and threaded into the first measuring plate, said second threaded shaft having a second knob for rotation of the second threaded shaft to clamp the second measuring clamped to the first measuring clamp or unclamp the second measuring plate for sliding and pivoting movement on the second measuring plate in a direction toward and away from the accelerator pedal pad;
   a first measuring indicia provided on the base plate and the first measuring plate from which a user can read the lateral distance between the brake pedal pad and the accelerator pedal pad; and,
   a second measuring indicia provided on the first measuring plate and the second measuring plate from which a user can read the vertical height between the pad surfaces of the brake pedal pad and the accelerator pedal pad.

* * * * *